Aug. 7, 1962
P. R. BUECHLER ET AL
3,048,496
FINISHED LEATHERS HAVING COATINGS OF A
POLYMER OF 55-80% VINYLIDENE CHLORIDE
AND 20-45% ($C_1$-$C_4$)-ALKYL ACRYLATE, AND
PRODUCTION THEREOF
Filed Dec. 9, 1959
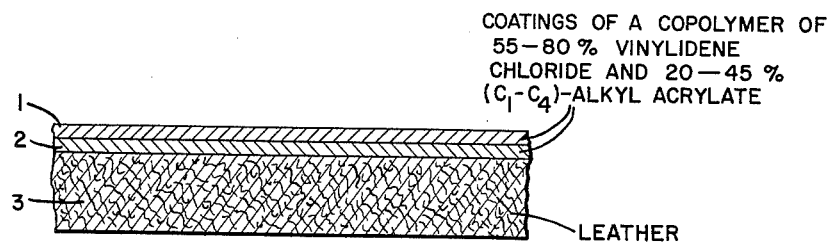
COATINGS OF A COPOLYMER OF
55–80 % VINYLIDENE
CHLORIDE AND 20—45 %
($C_1$-$C_4$)-ALKYL ACRYLATE
LEATHER
INVENTORS
PETER R. BUECHLER,
BENJAMIN B. KINE
BY Carl A. Castellan
ATTORNEYS 3,048,496
FINISHED LEATHERS HAVING COATINGS OF A POLYMER OF 55-80 PERCENT VINYLIDENE CHLORIDE AND 20-45 PERCENT ($C_1$-$C_4$)-ALKYL ACRYLATE, AND PRODUCTION THEREOF
Peter R. Buechler, Langhorne, and Benjamin B. Kine, Elkins Park, Pa., assignors to Rohm & Haas Company, Philadelphia, Pa., a corporation of Delaware
Filed Dec. 9, 1959, Ser. No. 858,314
6 Claims. (Cl. 117—11)

This invention is concerned with the finishing of leather and the coated leathers thereby obtained.

In Freudenberg et al. 2,126,321 leather was proposed to be finished by the application of one or more coats of an aqueous dispersion of a synthetic polymer obtained by the emulsion polymerization of various polymerizable compounds such as vinyl acetate and esters of acrylic acid and methacrylic acid. However, the application of poly(methyl acrylate) and poly(ethyl acrylate) in the form of their aqueous dispersions obtained in this manner results in the production of finished leathers having extremely tacky or "grabby" surfaces. Though the coatings obtained from such amorphous polymers are quite flexible, they are extremely sensitive to pressure. When the acrylic acid ester is hardened by copolymerization with methyl methacrylate to produce copolymers which after deposition in the form of films are substantially free of tackiness, the films are characterized by brittleness so that the coated leather cannot be flexed without cracking of the coating. The application of these polymers of acrylic esters resulted in coatings which were only moderately resistant to water; and, hence, the general practice became the application of a base-coat by means of such an aqueous polymer dispersion to certain types of leather, particularly buffed leathers, for the filling of imperfections therewith followed by the application of lacquer top-coats to provide the desired coloring and surface lustre along with waterproofing of the acrylic ester base-coat when used.

This practice is generally described in Walker et al. 2,204,520. Thus, plasticized nitrocellulose lacquers may be applied with or without such a base-coat of an aqueous acrylic polymer dispersion as the finishing coatings for full-grain and buffed leathers. When sufficient plasticizer is used in such coatings to provide good flexibility even at low temperatures in the range from −20° C. to 10° C., however, the coated leathers are characterized by an undesirable sticky surface, and because of the tendency for plasticizer to become lost gradually, the coating on such leathers gradually increases in brittleness and cracks with age. To some extent the nitrocellulose lacquers have been superseded in the coating of buffed leathers by a coating system involving the application of emulsion polymerized acrylate resins as a base-coat followed by the application of vinyl resin lacquers. Such products, while giving a finish of greater flexibility often have even more sticky surface characteristics than those obtained with nitrocellulose lacquers and are characterized even at normal temperatures by a "draggy" surface feel, that is one which does not readily slide over other surfaces (including its own surface) against which the coated leather surface is in contact.

Neither of these types of lacquer coatings is resistant to wet-molding operations. In fact, when the coated leather finished with one of these lacquers is bent over a corner of a table-top in wet condition, the mere rubbing with the molding tool readily removes the coating. Both systems have the disadvantage that they employ a plasticizer so that the coating tends to gradually increase in brittleness and hardness with age.

United States Patent 2,884,340 discloses one manner of overcoming the tackiness obtained with lacquer-finished leathers by the inclusion of a polyisocyanate.

In accordance with the present invention, it has been found that leathers having many outstanding characteristics can be obtained by the application of one or more coats of an aqueous dispersion of an emulsion copolymer of crystalline character and comprising 55 to 80% by weight of vinylidene chloride and 20 to 45% by weight of a lower acrylate, that is an ester of acrylic acid with a monohydric alcohol, specifically an alkanol having 1 to 4 carbon atoms, such as an ethyl acrylate, methyl acrylate, butyl acrylate, and propyl acrylate. The preferred copolymers contain 65 to 75% by weight of vinylidene chloride. The copolymers have molecular weights in the range from about 100,000 to several million, e.g., three to ten million, and may be obtained by any suitable emulsion copolymerization procedure. It is essential that the proportion of vinylidene chloride does not substantially exceed 80% by weight since it has been found that copolymers containing 85% thereof or higher exhibit reduced flexibility at room temperature and they also exhibit sensitivity to ultraviolet light so that coatings thereof become subject to degradation when exposed to sunlight. On the other hand, when the proportion of vinylidene chloride is substantially below 55% by weight, the crystallinity of the polymer is markedly reduced and coatings made therefrom begin to exhibit a grabbiness or tackiness which renders the coatings undesirable.

The single FIGURE of the drawing is a cross-section of a typical embodiment of the invention, greatly enlarged, using two coatings 1 and 2 herein described on the leather substrate 3.

The finish on the leather is thermoplastic and retains all of the advantages of such materials, especially flexibility, in conjunction with "dry" feel and toughness and yet is undamaged by any elevated temperature which the leather itself is able to withstand.

The copolymers may also contain up to 10% by weight of another monoethylenically unsaturated monomer, such as acrylic acid, methacrylic acid, acrylamide, methacrylamide, esters of acrylic acid with alkanols having 5 to 18 carbon atoms such as 2-ethylhexyl acrylate, lauryl acrylate, octadecyl acrylate, esters of methacrylic acid with $C_1$-$C_{18}$ aliphatic alcohols such as methyl, ethyl, butyl, hexyl, cyclohexyl, benzyl, 2-ethylhexyl, dodecyl, and octadecyl methacrylates, styrene, vinyltoluene, vinyl acetate, acrylonitrile, methacrylonitrile, and N-vinylpyrrolidinone.

Leather may be finished in accordance with the present invention by a multi-layer coating system using either two or three coats of aqueous polymer dispersions. One of the outstanding advantages of the present invention as compared to the conventional practices is the fact that the coating systems are exclusively of aqueous character.

In a simple two-coat system, both coating media may comprise the vinylidene chloride/acrylic acid ester copolymer. In this system the first coat is applied to such leathers as full-grain leathers, for example upholstery or garment leathers. In this first coating the concentration of the dispersed copolymer may be from about 1 to 30% by weight of the coating composition and it may contain one or more pigments to provide the desired color.

Any suitable pigment may be employed, depending on the color desired, including red iron oxide, chrome green, molybdate chrome orange, phthalocyanines, such as copper phthalocyanine, titanium dioxide, lithopone, chrome yellow, ultramarine blue, red cadmium, yellow cadmium, organic toners and lakes, and so on. The proportion of pigment may be from 5 to 150 parts by weight per 100 parts of the copolymer.

After the first coating composition is applied by any known coating equipment, such as by brush, roller-coating, or spraying, it is dried at an elevated temperature of 50° C. to 110° C. for a period of time, the length of which is inversely proportional to the degree of temperature and the rate and lowness of humidity of the air used in drying. The drying is effected rapidly in a period of about 10 seconds to 10 minutes.

The coated leather may also be dried slowly or in air at room temperature; although if the formulation does not contain materials which inhibit spherulite formation, the polymer films tend to become opaque and a lessening of gloss results. This lack of clarity and gloss can be corrected by subjecting the dried coated leathers to a high-temeprature embossing or a high-temperature smooth-plating operation. The temperature in this case should be sufficiently high so that the polymer is softened under the pressures employed and spherulitic formations are deformed. The temperatures and pressures necessary will vary somewhat with the copolymer composition. However, for the copolymer compositions described herein, temperatures ranging from 65° to 116° C. and pressures ranging from 50° to 4000 p.s.i. may be employed.

After embossing at this elevated temperature, the finish cools in ambient room temperature air sufficiently rapidly to prevent the development of cloudiness which might otherwise result from spherulites which would form from the aggregation of crystallites in a slow cooling process.

After the first coating has been dried or the embossing thereof has been completed, a final clear coat may be applied. This may simply be an aqueous dispersion containing from 10 to 40% by weight of the vinylidene chloride/acrylic acid ester copolymer. A clear coating is thus obtained. However, if desired, a delustrant such as titanium dioxide may be included to dull the gloss of the top-coat.

In an alternative procedure which is particularly applicable to the coating of buffed leathers, the two coatings with or without embossing as just described may be preceded by an initial coating by which an aqueous dispersion of an emulsion addition polymer, with or without a pigment may be applied to fill irregularities and to reduce penetration of subsequent coats of the vinyidene chloride/acrylic acid ester copolymer. While this first base-coat may employ an aqueous dispersion of a vinylidene chloride/acrylic acid ester copolymer as defined herein which copolymer may be the same as, or different from, that used in the subsequent coats, aqueous dispersions of other polymers may be used if desired. For example, polymers of acrylonitrile or acrylic acid esters with other monomers which contain reactive groups which impart adhesiveness to the leather may be employed. Examples of such copolymers are disclosed in United States Patents 2,828,220–4 inclusive and 2,879,178, and the disclosures of these patents are included herein by reference.

In all procedures employing the aqueous dispersions of vinylidene chloride/acrylic acid ester copolymers, the drying of the coating is preferably performed at elevated temperatures so that a quick drying is obtained to prevent the development of cloudiness. As mentioned hereinabove, drying at temperatures of 50° to 110° C. for a period of 10 seconds to 10 minutes generally meets this requirement.

An alternative to the rapid drying and/or embossing or plating at elevated temperatures is to incorporate in the vinylidene chloride copolymer coating composition a sufficient amount of extraneous materials, such as another acrylic acid ester copolymer which does not have a vinylidene chloride component, to prevent spherulite formation. This amount is generally about 40% or more of the total weight of polymers. However, these materials must not be used in such large amounts as to inhibit crystallite formation because if crystallite formation is inhibited, the advantageous characteristics, especially non-tackiness, abrasion-resistance, and water-resistance, of the copolymers described in this invention are lost. Since the margin between the amount necessary to inhibit spherulite formation and the amount necessary to inhibit crystallite formation is very small, and is dependent on the particular vinylidene chloride/acrylic ester copolymer employed, as well as other variables such as drying rate, etc., it can readily be perceived that this is not the most desirable method to employ, although use may be made of it in particular instances.

The coated leathers obtained in accordance with the present invention have the following advantageous characteristics. The color or top-coats are easily embossed. Smooth-plating can be performed after finishing to give easier slip. The color or top-coat is highly receptive to printing. Fewer coats are required as compared to conventional practices to obtain a given thickness of decorative or protective material on the leather. The product exhibits excellent grease-resistance. Since no plasticizer is needed, the coating shows permanent flexibility. Since the coating retains flexibility even at low temperatures, there is no excessive embrittlement when subjected to the normal conditions of winter climates. The surface of the coated leather presents a dry-feel which is outstanding when compared with polymers heretofore applied by aqueous systems for producing comparable flexibility. The resistance to crocking under wet conditions is excellent. The leather shows outstanding wet-molding properties. The bending of the wet leather over a table-top corner or other article to be covered and rubbing of the bent leather with a molding tool does not remove the finish. The polymer has a low heat conductivity so that a warm feeling of more leather-like character is obtained than that usually obtained with prior conventional finishes. The polymer does not detract from the thermal insulation properties of leather and, therefore, the coated leathers of the present invention are quite comfortable when worn as shoes or in the form of garments. The coated leather is flame-retardant because of the high proportion of chlorine in the polymer. The product also exhibits excellent abrasion-resistance and scuff-resistance. The finished leather of the present invention is also less susceptible to damage on heating than conventionally-finished leathers since the copolymer has a much higher softening temperature than those used in conventional finishes. When the vinylidene chloride/acrylic acid ester copolymer is employed in the base-coating, excellent adhesion to the leather is obtained apparently because of the chlorine atoms and their electronegative polarity. Although the coatings of the finished leather are deposited from aqueous systems exclusively, they have outstanding water-resistance not only withstanding ordinary washing but also wet abrasion. The adhesion of the copolymer to leathers of all types is so pronounced and outstanding that wet-molding operations may be performed on the coated leather even when the leather is a fully vegetable-tanned type.

The exclusively aqueous coating procedure by which the vinylidene chloride/acrylic acid ester copolymer can be applied presents the advantages characteristic of such systems in the savings in fire insurance, safety devices, fire control equipment, and solvent-recovery systems.

In the following examples which are illustrative of the present invention the parts and percentages are by weight unless otherwise indicated.

Examples A through D illustrate the preparation of suitable copolymers of simple and of graft type for use in the invention.

Example A

A solution is prepared of 4 parts of sodium lauryl sulfate in 100 parts of water. A mixture of 32 parts of ethyl acrylate and 59.5 parts of vinylidene chloride is added with stirring to the solution. The resulting mixture is cooled to 18° C. A solution of 0.2 part of ammonium persulfate in 3 parts of water is then added followed by the addition of 0.25 part of sodium hydrosulfite in 3 parts of water. Stirring is continued throughout the reaction. In a short time the temperature of the mixture begins to rise and continues to rise to 40° C. where it is maintained with the aid of an ice bath. At the end of the reaction, the product is cooled to 18° C. It is then adjusted to a pH of 9.5 with ammonium hydroxide.

Example B

A solution is prepared of 3.5 parts of the sodium salt of dioctyl sulfosuccinic acid in 150 parts of water. A mixture of 32 parts of ethyl acrylate and 33.9 parts of vinylidene chloride is added with stirring to the solution. The resulting mixture is cooled to 17° C. A solution of 0.15 part of ammonium persulfate in 2 parts of water is then added followed by the addition of 0.2 part of sodium hydrosulfite in 4 parts of water. Stirring is continued throughout the reaction. In a short time the temperature of the mixture begins to rise and continues to rise to 40° C. where it is maintained with the aid of an ice bath. At the end of the exothermic reaction, the reaction mixture is cooled to 25° C. and 32 parts of vinylidene chloride are slowly added to the reaction mixture over a period of 25 minutes to effect grafting of this latter portion of vinylidene chloride onto the initially-formed copolymer. At the end of this time, 0.1 part of ammonium persulfate in 2 parts of water and 0.12 part of sodium metabisulfate in 3 parts of water are added to the reaction mixture. At the completion of the reaction, the pH is adjusted to 8.5 with triethylamine.

Example C

An aqueous polymer dispersion is prepared in the same manner as in Example A except that the final step of neutralization is omitted.

Example D

The procedure of Example A is followed. Polymers of the following monomers in the proportions given are thus prepared:

(a) 35 butyl acrylate/65 vinylidene chloride.
(b) 20 butyl acrylate/10 ethyl acrylate/70 vinylidene chloride.
(c) 15 ethyl acrylate/10 methyl methacrylate/75 vinylidene chloride.

In the following examples, certain tests are referred to which are described in the following publications:

(1°) "Upholstery Leather: Industry Specifications and Standards," Published by Upholstery Leather Group, Inc., 141 E. 44th St., New York 17, N.Y.

(2°) Journal of Research of National Bureau of Standards, volume 42, pages 481–497.

(3°) Ford Motor Company Manufacturing Standards, April 1955, Test MIFI-2-3 Specification 3.11.

The test is followed by the designation (1°), (2°), or (3°) to indicate where the description is to be found.

Example 1

A leather finish formulation, employing the aqueous polymer dispersion obtained in Example A, is made as follows:

| Material: | Parts |
|---|---|
| Polymer dispersion (Example A) | 100 |
| Water | 91.4 |
| Aqueous pigment (red iron oxide) dispersion (about 40% pigment) | 65.6 |
| Aqueous wax dispersion (about 16% solids) | 7.5 |
| Total | 264.5 |

This formulation is sprayed on a side of tanned but unfinished snuffed grain case leather using conventional paint spray equipment. The leather is then dried for three minutes in a stream of heated air at 190° F. in a tunnel drier.

After allowing the leather to equilibrate with the ambient atmosphere, it is embossed with a hair cell plate in a heated hydraulic press at 200° F. and 1050 p.s.i. The cooled leather is then sprayed with an intermediate coat made as follows:

| Material: | Parts |
|---|---|
| Aqueous polymer dispersion (Example A) | 100 |
| Water | 115 |
| Aqueous pigment dispersion (about 35% solids) | 55 |
| Total | 270 |

The leather is then dried in a stream of heated air in a tunnel drier at 175° F. for three minutes. After equilibration with ambient atmosphere, it is then sprayed with a light stipple coat, i.e., a coat of finish sprayed from a sufficient height so that coalescence of droplets does not occur and a "stippled" effect is achieved. This stipple coat is formulated as follows:

| Material: | Parts |
|---|---|
| Aqueous polymer dispersion (Example A) | 100 |
| Water | 105 |
| Acid leather dark brown R dye (Color Index Acid Brown 67) | 1 |
| Total | 206 |

The stipple coat is tunnel dried at 165° F. for four minutes. Equilibrium with ambient atmosphere is again achieved. Then a topcoat of the following formula is sprayed on:

| Material: | Parts |
|---|---|
| Water | 77.2 |
| Aqueous wax dispersion (about 16% solids) | 12.0 |
| Aqueous polymer dispersion (Example B) | 94.8 |
| Total | 184.0 |

The leather is tunnel dried at 190° F. for three minutes, equilibrated with ambient atmosphere and plated with a smooth plate heated to 170° F. in a hydraulic press at 1,000 p.s.i The finished leather produced is more resistant to wet molding by the method hereinabove described than a control sample finished by normal tannery procedures with an aqueous acrylic ester base coat, and non-aqueous intermediate color, stipple and topcoats made with nitrocellulose. Other comparative test results are as follows:

| | Leather Finished By This Example | Control (Nitrocellulose Lacquers) |
|---|---|---|
| Abrasion Test, Schieffer (2°) (15 lbs., 2,500 cycles). | No wear | 35% exposure (of) leather. |
| Abrasion Test, Taber (3°) (CS-10 wheel, 500 g., 1,000 cycles). | No leather exposed. | 12% exposure of leather. |
| Water-Spotting [1] | None | Slight after one hour. |
| Resistance to Fading (120 hrs.) (1°). | OK | Finish Cracks on Single Bend. |
| Resistance to Crocking (1°) | Excellent | Excellent. |

[1] Water-Spotting test is run as follows: Four drops of water are placed on the leather. One is wiped off after five minutes, another after 15 minutes, another after 30 minutes, and the last one after one hour. Whitening of the finish or swelling of the leather in the area is noted.

Example 2

Full grain case leather is finished by the same procedure employed in Example 1 except that the base-coat is plated with a smooth plate at 150° F. and 1,000 p.s.i., the intermediate coat and the stipple coat are omitted, and the topcoat formulation is replaced with:

| Material: | Parts |
|---|---|
| Water | 43.0 |
| Aqueous pigment dispersion (about 35% solids) | 2.8 |
| Aqueous wax dispersion (about 16% solids) | 3.5 |
| Aqueous polymer dispersion (Example A) | 50.7 |
| Total | 100.0 |

The leather is plated with a smooth plate at 160° F. and 1,000 p.s.i. Test results are as follows:

| | |
|---|---|
| Abrasion test, Schieffer (2°) (15 lbs., 2,500 cycles) | No wear. |
| Abrasion test, Taber (3°) (CS-10 wheel, 1,000 g.) | No leather exposed. |
| Water-spotting | None. |
| Resistance to fading (120 hrs.) (3°) | Excellent. |
| Resistance to crocking (1°) | Excellent. |

Example 3

Unfinished hand-buff upholstery leather is sprayed with the following base-coat formulation:

| Material: | Parts |
|---|---|
| Aqueous dispersion of an emulsion copolymer of about 75% butyl acrylate, about 7% of vinylpyridine, and about 18% of butyl methacrylate (about 32% solids) | 94.2 |
| Water | 51.2 |
| Aqueous pigment dispersion (about 35% solids) | 44.6 |
| Total | 190.0 |

The leather is dried in a slowly-moving stream of air at 55° C. for two hours. After cooling to room temperature, the following intermediate color coat is then sprayed on:

| Material: | Parts |
|---|---|
| Water | 93.1 |
| Aqueous pigment dispersion (about 35% solids) | 37.4 |
| Concentrated ammonium hydroxide (14%) | 1.0 |
| Aqueous polymer dispersion (Example C) | 100.0 |
| Total | 231.5 |

The leather is dried in a slowly moving stream of air at 55° C. for 2½ hours. Then the following topcoat composition is applied:

| Material: | Parts |
|---|---|
| Water | 117.0 |
| Aqueous wax dispersion (about 16% solids) | 60.0 |
| Concentrated ammonium hydroxide (28%) | 1.5 |
| Aqueous polymer dispersion from Example C | 143.0 |
| Total | 321.5 |

The leather is dried overnight at room temperature under ambient conditions. Next morning it is embossed with a hair cell plate in a hydraulic press at 200° F. and a pressure of 1,050 p.s.i.

An upholstery leather of very desirable appearance and with a smooth leather-like feel is obtained. Samples of the leather responded to tests as follows:

| | |
|---|---|
| Greuel cold fold test (1°) | No cracking above −40° F. |
| Schieffer test (8 lbs., 500 cycles) | No wear. |
| Resistance to crocking (1°) | Excellent. |
| Resistance to fading (120 hrs.) (1°) | OK. |
| Wear-resistance (1°) | No wear. |
| Wet-molding | Excellent. |
| Newark flex test (1°) | Two. |

Example 4

Full grain upholstery leather is milled and then the grain surface is sprayed with a formulation made as follows:

| Material: | Parts |
|---|---|
| Water | 125.0 |
| Aqueous dispersion of TiO$_2$ (35% solids) | 7.1 |
| Aqueous dispersion of hydrated iron oxide (35% solids) | 42.7 |
| Material—Continued | Parts |
| Aqueous dispersion of iron oxide (27% solids) | 7.1 |
| Aqueous dispersion of chromium molybdate pigment (40% solids) | 7.1 |
| Aqueous wax dispersion (about 16% solids) | 33.0 |
| Concentrated ammonium hydroxide (28%) | 1.5 |
| Aqueous polymer dispersion (Example D(a)) | 60.0 |
| Aqueous polymer dispersion (Example C) | 180.0 |

The sprayed leather is dried at 55° C. for two hours in an oven and reconditioned to ambient conditions.

A fine, natural-looking, very supple leather is obtained. Test results are as follows:

| | |
|---|---|
| Schieffer test (2°) (8 lbs., 500 cycles) | No wear. |
| Wear-resistance (1°) | No wear. |
| Resistance to crocking (1°) | Excellent. |
| Resistance to fading (120 hrs.) (1°) | OK. |
| Wet-molding | Excellent. |

Example 5

A coating formulation was prepared as follows:

| Material: | Parts |
|---|---|
| Aqueous 4% carbon black dispersion | 20 |
| Aqueous wax dispersion (16% solids) | 5 |
| Aqueous polymer dispersion (Example D(b)) | 20 |
| Aqueous 18% filler clay dispersion | 10 |
| Water | 45 |
| Total | 100 |

Two coats of the above formulation were swabbed onto black drum-dyed chrome-tanned side leather whose surface had previously been snuffed. The leather was dried after each coat at 131° F. The dried leather was smooth-plated at 150° F., at a pressure of 1,050 lbs. per square inch. Then two more coats of the same formulation were sprayed onto the leather surface. Again the leather was dried at 131° F. between coats. A topcoat of the following composition was then sprayed onto the surface:

| Material: | Parts |
|---|---|
| Water | 56.9 |
| Aqueous polymer dispersion (Example B) | 71.1 |
| Aqueous wax dispersion (16% solids) | 10.0 |
| Total | 138.0 |

The leather was then smooth-plated at 150° F., at 1,050 p.s.i.

The coated leather was well covered and had an excellent smooth appearance and feel. It had good surface slip. The adhesion of the finish to the leather surface was excellent. The "break" of the leather was excellent. Physical tests were as follows:

| | |
|---|---|
| Flex test (Rohm & Haas walking test machine) (50,000 cycles) | Excellent. |
| Dry-crock test (1°) | No crocking. |
| Wet-crock test (1°) | No crocking. |
| Water-spotting | None. |
| Tape test | No finish pulled off. |

NOTE.—The tape test involves application with firm pressure of a 1-inch wide pressure-sensitive tape, such as masking tape or "Scotch" tape, to the finished surface of the leather and then jerking the tape off at a sharp angle.

It is to be understood that changes and variations may be made without departing from the spirit and scope of the invention as defined by the appended claims.

We claim:

1. A method of producing a finished leather having a durable, water-resistant, washable, abrasion-resistant finish, and having outstanding wet-molding properties which consists of the application of film-forming materials in the form of emulsion polymers exclusively and comprises the steps of applying an aqueous dispersion containing 1 to 30% by weight of a crystalline copolymer of 55 to 80% by weight of vinylidene chloride with 20 to 45% by weight of an ester of acrylic acid with a lower alkanol having 1 to 4 carbon atoms, drying said coated leather at a temperature of 50° to 110° C. in a period of 10 seconds to 10 minutes, thereafter applying a second coating of an aqueous dispersion containing 10 to 40% by weight of a crystalline copolymer of 55 to 80% by weight of vinylidene chloride with 20 to 45% by weight of an ester of acrylic acid with a lower alkanol having 1 to 4 carbon atoms.

2. A finished leather having a durable, water-resistant, washable, abrasion-resistant finish, and having outstanding wet-molding properties obtained by the process of claim 1.

3. A method of producing a finished leather having a durable, water-resistant, washable, abrasion-resistant finish, and having outstanding wet-molding properties which consists of the application of film-forming materials in the form of emulsion polymers exclusively and comprises the steps of applying an aqueous dispersion containing 1 to 30% by weight of a crystalline copolymer of 55 to 80% by weight of vinylidene chloride with 20 to 45% by weight of an ester of acrylic acid with a lower alkanol having 1 to 4 carbon atoms, drying said coated leather at a temperature of 50° to 110° C. in a period of 10 seconds to 10 minutes, embossing the coated leather at a temperature of 65° to 116° C., thereafter applying a second coating of an aqueous dispersion containing 10 to 40% by weight of a crystalline copolymer of 55 to 80% by weight of vinylidene chloride with 20 to 45% by weight of an ester of acrylic acid with a lower alkanol having 1 to 4 carbon atoms.

4. A finished leather having a durable, water-resistant, washable, abrasion-resistant finish, and having outstanding wet-molding properties obtained by the process of claim 3.

5. A method of producing a finished leather having a durable, water-resistant, washable, abrasion-resistant finish, and having outstanding wet-molding properties which consists of the application of film-forming materials in the form of emulsion polymers exclusively and comprises the steps of applying an aqueous dispersion containing 1 to 30% by weight of a crystalline copolymer of 55 to 80% by weight of vinylidene chloride with 20 to 45% by weight of an ester of acrylic acid with a lower alkanol having 1 to 4 carbon atoms, drying said coated leather at a temperature of 50° to 110° C. in a period of 10 seconds to 10 minutes, smooth-plating the coated leather at a temperature of 65° to 116° C., thereafter applying a second coating of an aqueous dispersion containing 10 to 40% by weight of a crystalline copolymer of 55 to 80% by weight of vinylidene chloride with 20 to 45% by weight of an ester of acrylic acid with a lower alkanol having 1 to 4 carbon atoms.

6. A finished leather having a durable, water-resistant, washable, abrasion-resistant finish, and having outstanding wet-molding properties obtained by the process of claim 5.

References Cited in the file of this patent

UNITED STATES PATENTS

| 2,828,220 | McWherter et al. | Mar. 25, 1958 |
| 2,884,340 | Loshaek | Apr. 28, 1959 |
| 2,910,385 | Berry et al. | Oct. 27, 1959 |